United States Patent [19]

Stengel

[11] Patent Number: 4,475,450

[45] Date of Patent: Oct. 9, 1984

[54] COMPOSTING MACHINE

[76] Inventor: Paul G. Stengel, R.D. #2, Kennett Square, Pa.

[21] Appl. No.: 926,013

[22] Filed: Jul. 19, 1978

[51] Int. Cl.³ .............................................. B30B 5/06
[52] U.S. Cl. .................................. 100/100; 100/153; 239/679
[58] Field of Search ........................ 100/100, 151, 153; 239/679

[56] References Cited

U.S. PATENT DOCUMENTS

| | | | |
|---|---|---|---|
| 2,646,913 | 7/1953 | Goldberg | 100/51 |
| 2,693,304 | 11/1954 | Davis | 100/151 |
| 3,791,593 | 2/1974 | Griffin | 100/100 |
| 3,857,335 | 12/1974 | Wagley | 100/100 |

FOREIGN PATENT DOCUMENTS

1427985  3/1976  United Kingdom .................. 10/153

Primary Examiner—Billy J. Wilhite

[57] ABSTRACT

A machine for turning over compost in an initial pile thereof and molding it into a new pile comprises a wheeled frame mounting a feed roller and a set of endless belt conveyors. As the machine advances into the initial pile of compost the compost is picked up and fed to the rear and onto the conveyors, which are adapted for depositing the compost from the outer sections of the initial pile of compost in the central section of the new pile being molded, and the compost from the central section of the initial pile of compost in the outer sections of the new pile being molded.

12 Claims, 15 Drawing Figures

COMPOSTING MACHINE

BACKGROUND OF THE INVENTION:

1. Field of the Invention

The present invention relates to machines for turning over and aerating the manure and/or other ingredients used in the preparation of compost required by mushroom growers for the beds in which they grow their product.

2. Description of the Prior Art

U.S. Pat. No. 3,791,593, issued to Gordon Douglas Griffin, February 12, 1974, teaches a machine for destacking and then restacking a pile of compost, which machine comprises a wheeled frame, feed means mounted on said frame and adapted to contact a pile of compost and feed it rearwardly at a relatively low velocity, and sets of rapidly rotatable members positioned behind the feed means, each member being angled with respect to the central vertical plane of the machine such that, in use, compost fed by the feed means to the rapidly rotatable members is thrown thereby upwardly, rearwardly and towards the sides of the machine at a relatively high velocity. A machine embodying the teaching of said prior art patent suffers certain disadvantages.

The rotatable members must be rotated at such a high rate of speed that frequently the tines carried by them are broken off or knocked out of alignment when the tines pick up the compost from the feed means. Replacing or realigning the tines is not only costly but also inconvenient because of the down time required for making repairs. But most importantly, when the tines pick up the compost from the feed means, the compost is struck by the tines with such force that it may be damaged.

SUMMARY OF THE INVENTION

A principle object of the present invention is to provide a machine for transferring compost materials from one pile thereof to another without damaging the material.

Another object of the present invention is to provide a machine for destacking a pile of compost and feeding the destacked compost to means operating at a relatively low rate of speed for transferring the compost to another pile for restacking.

Still another object of the present invention is to provide such a machine wherein the means for transferring the compost from pile to pile is devoid of rapidly rotatable tined reels.

Another object of the present invention is to provide such a machine wherein the means for transferring the compost from pile to pile includes a set of conveyors which cross-mix the compost during the restacking operation.

Yet another object of the present invention is to provide such a machine wherein the conveyors are readily adjustable positionally each relative to the others to facilitate cross-mixing of the compost materials.

Still another object of the present invention is to provide such a machine which requires less power for its operation than compost machines of the type which utilize rapidly rotatable tined reels.

DESCRIPTION OF THE PREFERRED EMBODIMENT

The following description is directed to the specific embodiment of the invention disclosed in the drawings. It is not addressed to the scope of the invention, which may be practiced in a variety of forms.

The composting machine according to this invention comprises a rigid frame 10 of inverted U-shaped having opposite sidewalls 12 and 14 spanned by a top wall 16. The frame 10 is carried by a pair of driving wheels 18 at the rear of the frame and a pair of caster wheels 20 at the forward end of the frame. Guide walls 22 and stacking walls 24 are provided respectively at the forward and rearward ends of the frame 10, the guide walls 22 being adapted for movement relative to each other to suit the width of the pile of compost being treated, and the stacking walls 24 being adapted for movement relative to each other to control the width of the new stack being molded. Any suitable means may be provided for moving the compost machine selectively fore and aft. A steering wheel 26 is operatively connected to the caster wheels 20 and is operable for guiding the compost machine. Suitable means, of which only the foot pedal 28 is shown, are provided within reach of an operator standing at the steering wheel 26 for the general control of the compost machine. The wheeled frame and the guide and stacking walls and the steering means and general controls may be somewhat similar to those disclosed by U.S. Pat. No. 3,791,593, issued to Gordon Douglas Griffin, Feb. 12, 1974, to which reference may be had for further details of construction and for method of operation.

A feed roller 30 is rotatably mounted between the sidewalls 12 and 14 of the frame 10 and is provided with a set of tines 32 projecting radially from its surface for contacting the compost in the initial pile thereof as the machine advances. The feed roller 30 is of a size which permits it to feed the whole of the initial pile. For example, it may be in the order of eight feet in length and have an overall diameter (including tines) of seven feet six inches. Any suitable means may be provided for actuating the feed roller 30, preferably at the rate of approximately 45 r.p.m. For example, an electric motor 34 may be mounted upon the top wall 16 of the frame 10 and operatively connected to the feed roller 30 by means comprising an endless belt drive 33 and an endless belt drive 35.

Referring particuarly to FIGS. 1-4, mounted to the rear of the feed roller 30 are conveyors 36 and 38 on the left side of the machine and conveyors 40 and 42 on the right side of the machine. The conveyors 36 and 40 respectively overlie the conveyors 38 and 42, conveyors 40 and 42 being constructed respectively to the left hand of conveyors 36 and 38. The upper conveyors 36 and 40 and the top of the feed roller 30 are disposed at approximately the same level, and the lower conveyors 38 and 42 and the central axis of the feed roller 30 are disposed at approximately the same level.

Referring particularly to FIGS. 5-9, conveyor 36 comprises a frame having a pair of laterally spaced longitudinally extending plate stringers 44 tied together by a plurality of transversely extending tubular members 46. Each end of each stringer is fitted with a bearing block 48 mounted thereon by means of a take-up device 50. At the head of the conveyor a shaft 52 extends through the bearing blocks 48. Mounted on the shaft 52 is a head pulley 54, collars 56 and a pulley 58 for a V-belt 60. At the tail of the conveyor a shaft 62 extends through the bearing blocks 48. Mounted on the shaft 62 is a tail pulley 64 and collars 66. Extending about the head and tail pulleys is an endless belt 68 fitted with transversely extending cleats 70. Idler rollers, designated 71, are provided at suitable intervals for supporting the upper run of the belt 68. The belt 60 is actuated by a pulley 72 carried by a change-speed unit 74 powered by an electric motor 76. The change-speed unit and the motor are mounted over the upper run of the conveyor, upon a framework generally designated 78.

Referring particularly to FIGS. 2, 3, 5, 6 and 9, affixed to the stringers 44 respectively are a pair of clip angles 80 seated upon a tubular member 82 extending across the machine between the sidewalls 12 and 14 of the frame 10. The clip angles are releasably secured to the member 82 by U-bolts 84 extending about the member 82 and through elongated holes in the angles 80. Thus the tail end of the conveyor 36 is seated upon and carried by the member 82. Extending over the conveyor 36 is a yoke member 86 with arms pivotally connected respectively to the stringers 44, as at 88. Extending upwardly from the yoke is a link chain 90 detachably connected to a tubular member 92 extending across the machine between the sidewalls 12 and 14 of the frame 10. Thus the head end of the conveyor 36 is suspended from and carried by the tubular member 92.

Referring particularly to FIGS. 10-14, conveyor 38 comprises a frame having a pair of laterally spaced longitudinally extending plate stringers 94 tied together by a plurality of transversely extending tubular members 96. Each end of each stringer is fitted with a bearing block 98 mounted thereon by means of a take-up device 100. At the head of the conveyor a shaft 102 extends through the bearing blocks 98. Mounted on the shaft 102 is a head pulley 104, collars 106 and a pulley 108 for a V-belt 110. At the tail of the conveyor a shaft 112 extends through the bearing blocks 98. Mounted on the shaft 112 is a tail pulley 114 and collars 116. Extending about the head and tail pulleys is an endless belt 118 fitted with transversely extending cleats 120. Idler rollers, designated 121, are provided at suitable intervals for supporting the upper run of the belt 118. The belt 110 is actuated by a pulley 122 carried by a change-speed unit 124 powered by an electric motor 126. The change-speed unit and the motor are suspended from the conveyor and thereby disposed under it by means of a framework generally designated 128.

Referring particularly to FIGS. 2, 4, 10, 11 and 14, affixed to the stringers 94 respectively are a pair of clip angles 130 seated upon a tubular member 132 extending across the machine between the sidewalls 12 and 14 of the frame 10. The clip angles are releasably secured to the member 132 by U-bolts 134 extending about the member 132 and through elongated holes in the angles 130. Thus the tail end of the conveyor 38 is seated upon and carried by the member 132. The framework 128 is seated upon a tubular member 136 extending across the machine between the sidewalls 12 and 14 of the frame 10, and is releasably secured thereto by U-bolts 138 extending about the member 136 and through elongated holes in members of the framework 128. Thus the head end of the conveyor 38 is seated upon and carried by the member 136.

Figure 1:
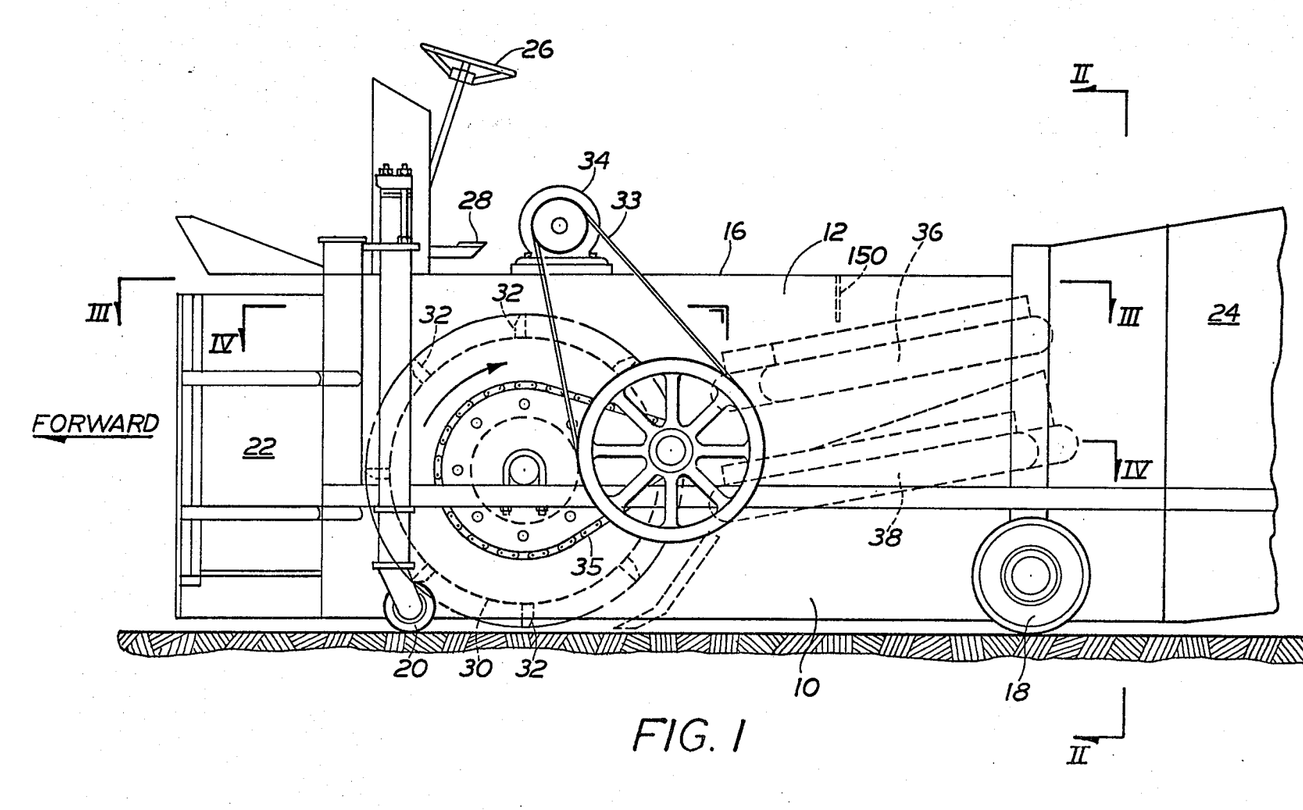
FIG. 1 is a schematic side view of a composting machine constructed in accordance with and embodying the present invention.
Figure 2:
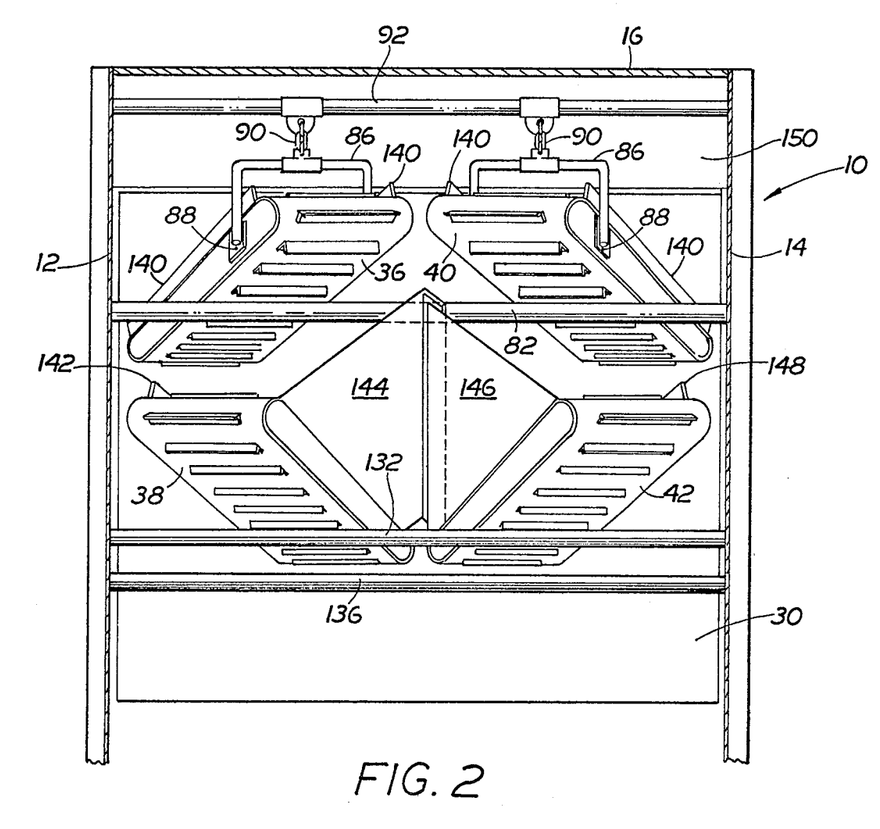
FIG. 2 is a section on lines II—II in FIG. 1, parts being omitted for the sake of clarity.
Figures 3, 15:
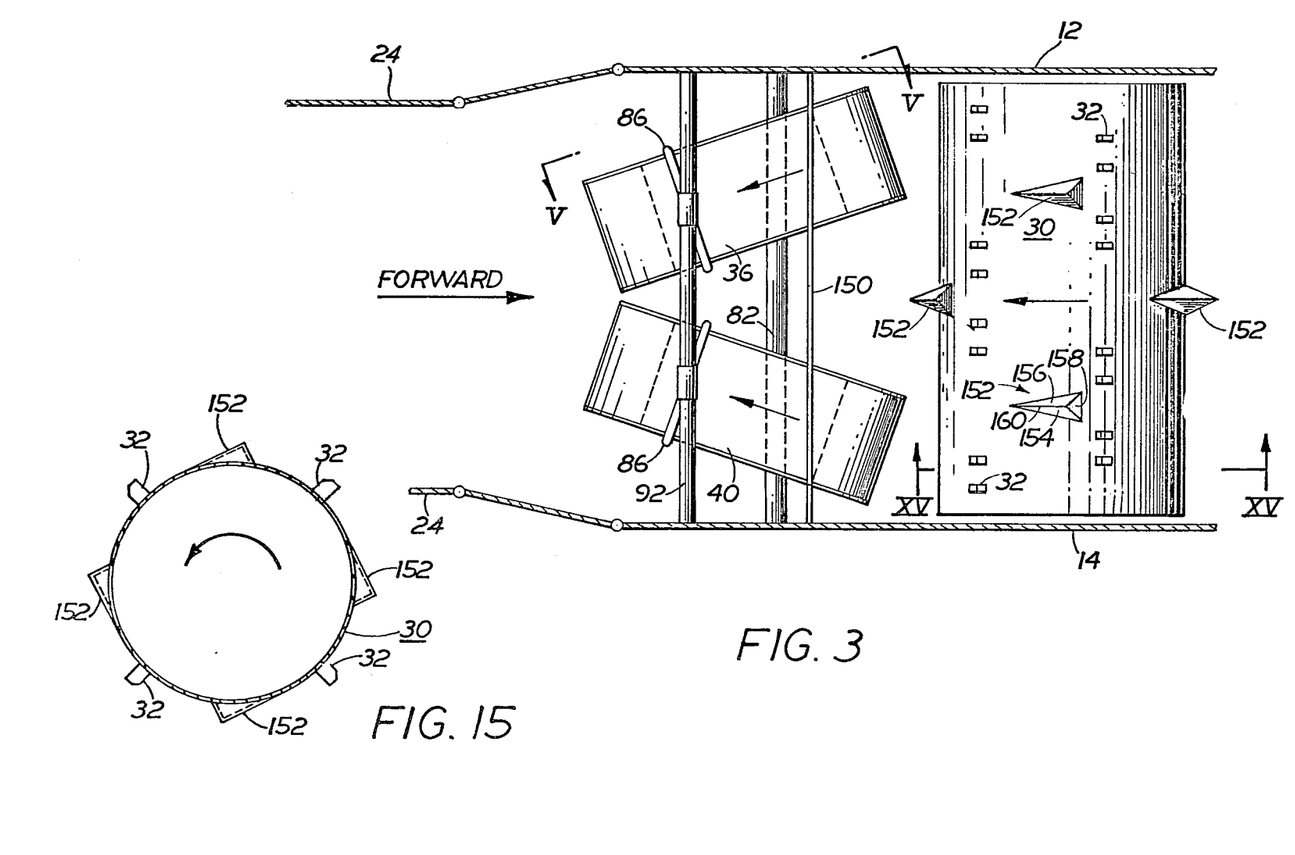
FIG. 3 is a section on line III—III in FIG. 1.
FIG. 15 is a section on lines XV—XV in FIGS. 3 and 4.
Figure 4:
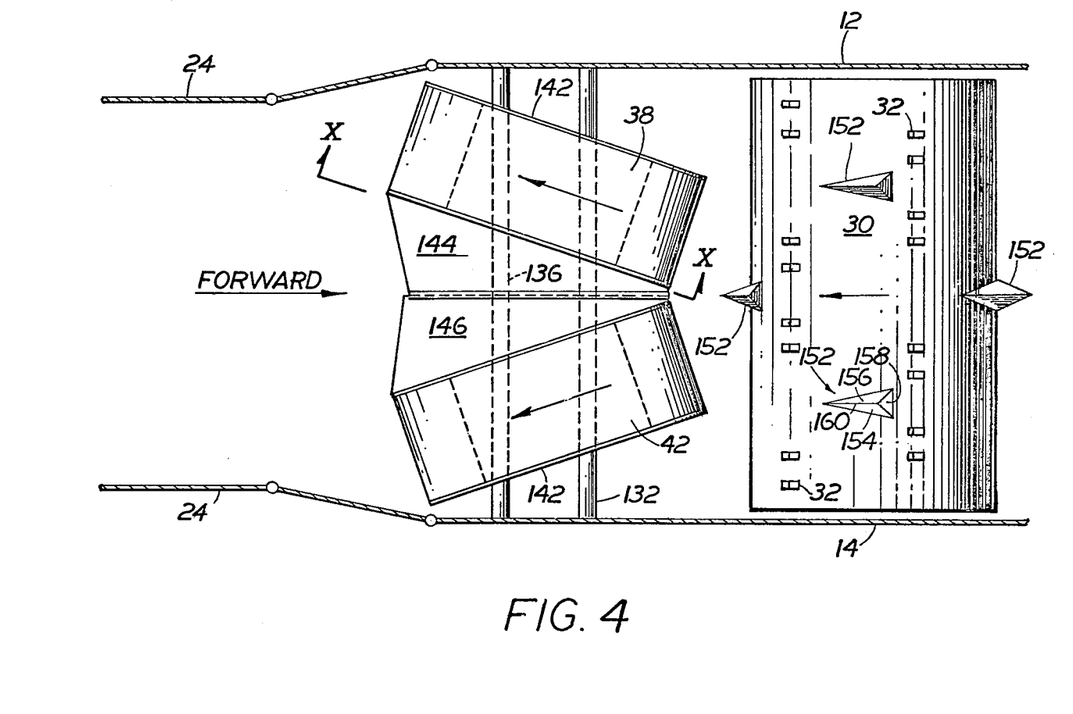
FIG. 4 is a section on line IV—IV in FIG. 1.
Figure 5:
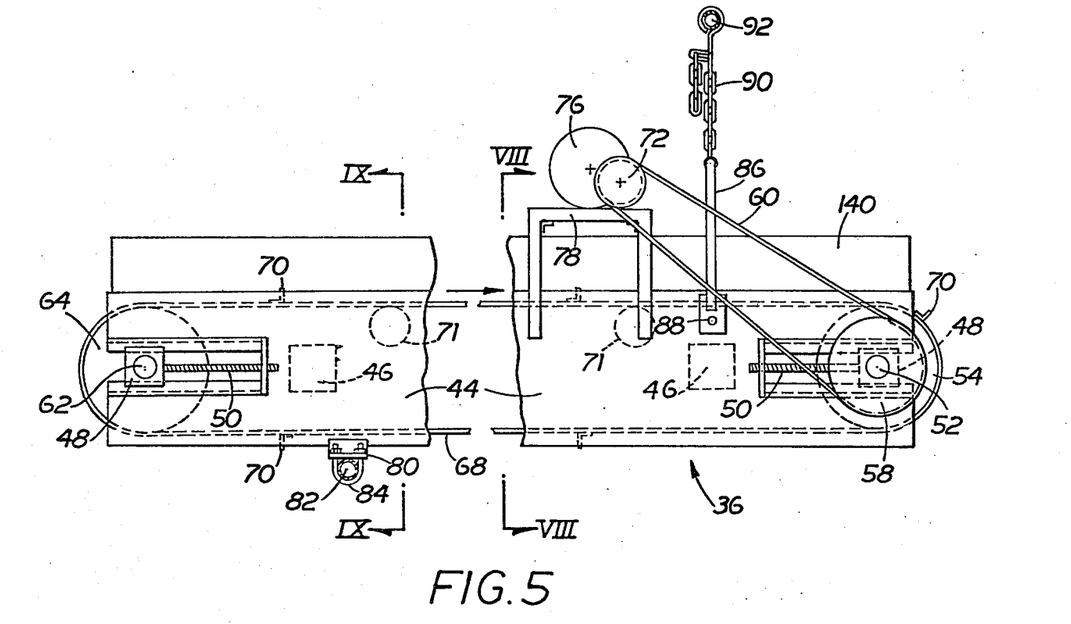
FIG. 5 is a side view of the upper left conveyor shown in FIG. 2, as indicated by lines V—V in FIG. 3.
Figure 6:
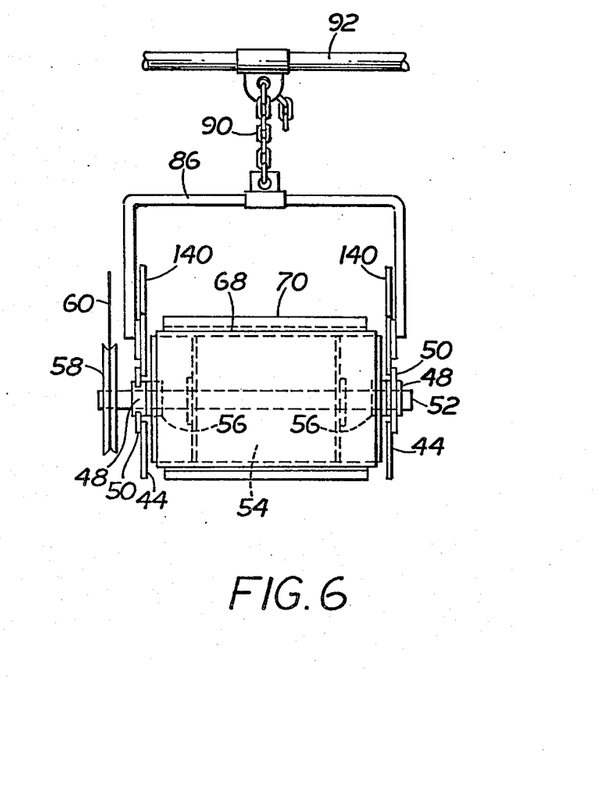
FIG. 6 is an end view looking at the head of the conveyor shown in FIG. 5.
Figure 7:
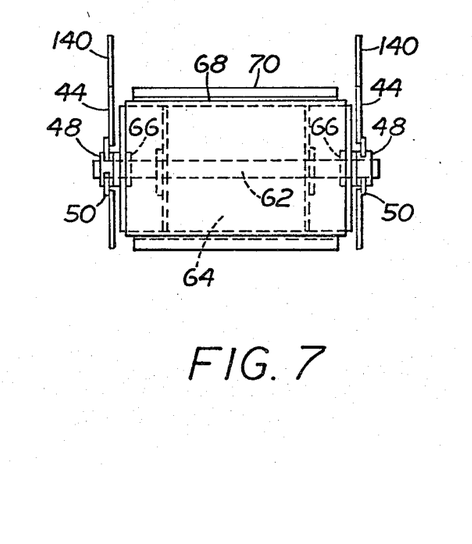
FIG. 7 is an end view looking at the tail of the conveyor shown in FIG. 5.
Figure 8:
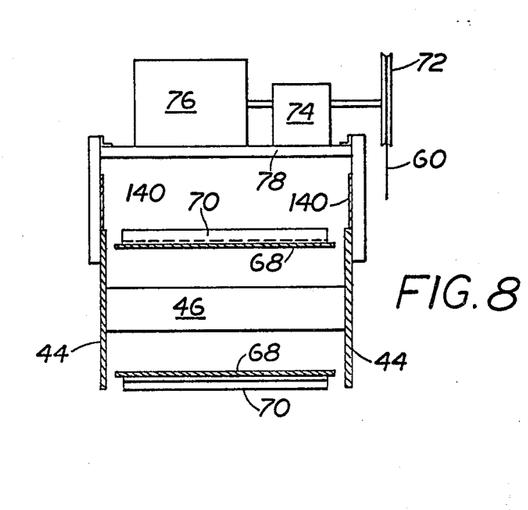
FIG. 8 is a section on lines VIII—VIII in FIG. 5.
Figure 9:
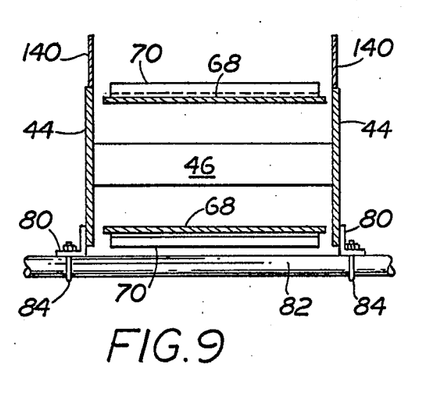
FIG. 9 is a section on lines IX—IX in FIG. 5.
Figure 10:
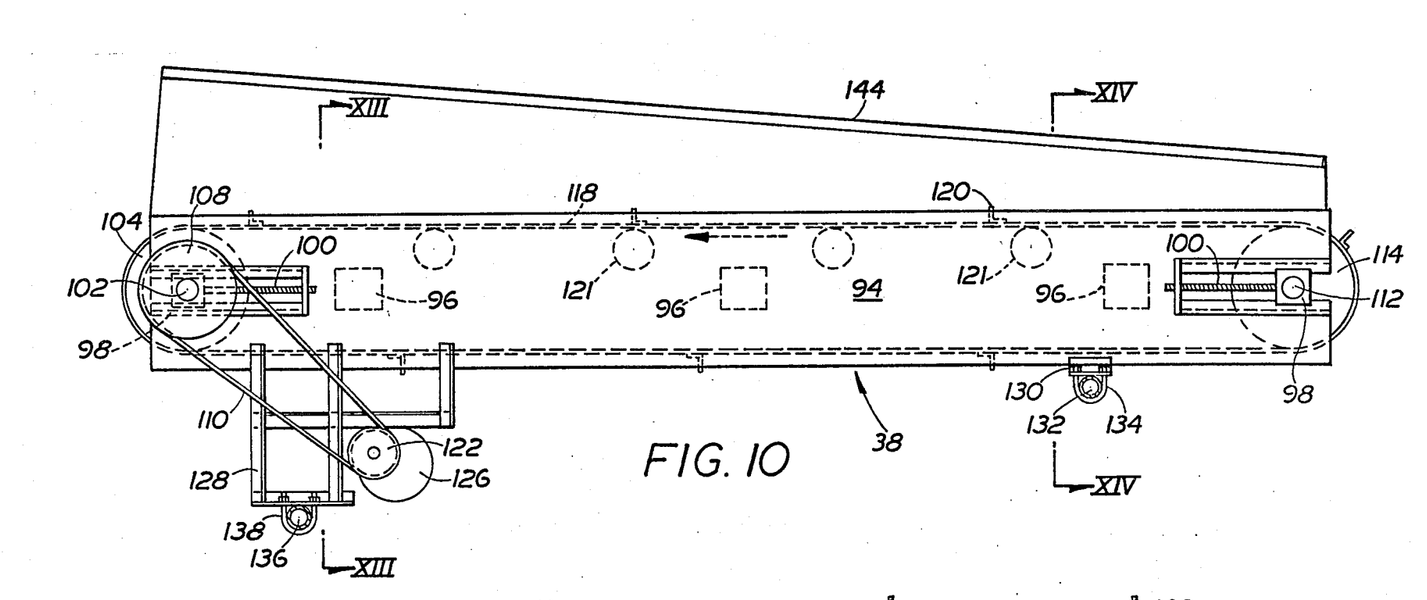
FIG. 10 is a side view of the lower left conveyor shown in FIG. 2, as indicated by lines X—X in FIG. 4.
Figure 11:
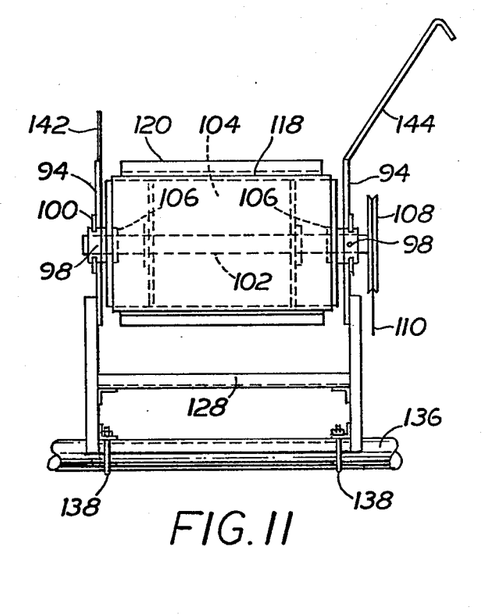
FIG. 11 is an end view looking at the head of the conveyor shown in FIG. 10.
Figure 12:
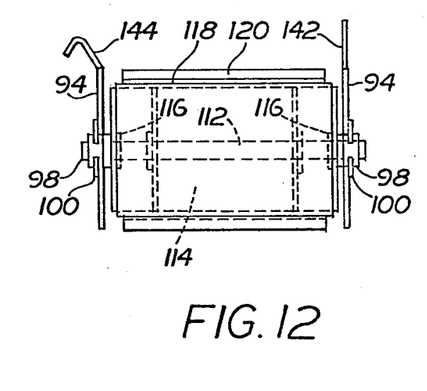
FIG. 12 is an end view looking at the tail of the conveyor shown in FIG. 10.
Figure 13:
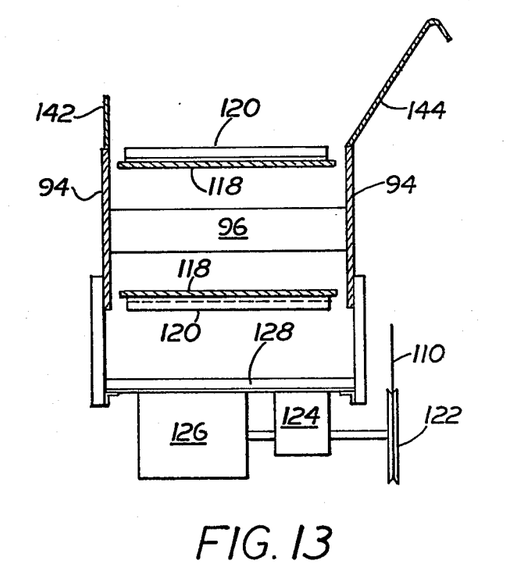
FIG. 13 is a section on lines XIII—XIII in FIG. 10.
Figure 14:
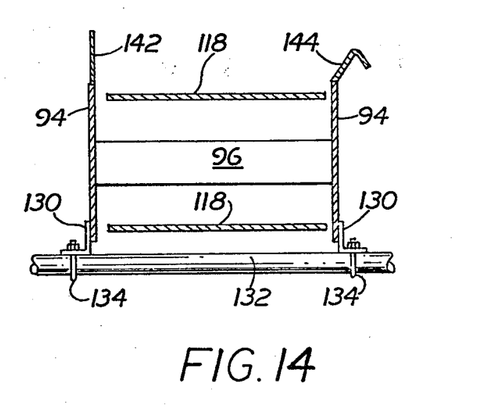
FIG. 14 is a section on lines XIV-XIV in FIG. 10.

Referring particularly to FIG. 3, it will be noted that the tail ends of the conveyors 36 and 40 respectively are disposed directly to the rear of the opposite end sections of the feed roller 30, and that the conveyors converge rearwardly therefrom at an angle of approximately ten degrees relative to the longitudinally extending central vertical plane of the machine. Referring particularly to FIG. 4, it will be noted that the tail ends of the conveyor 38 and 42 respectively are disposed directly to the rear of the central sections of the feed roller 30 respectively on opposite sides of the longitudinally extending central vertical plane of the machine, and that the conveyors diverge rearwardly therefrom at an angle of approximately ten degrees relative to the longitudinally extending central vertical plane of the machine. Each of the conveyors has a width approximately in the order of one-fourth the length of the feed roller 30. Referring particularly to FIG. 1, the upper conveyors 36 and 40 are inclined rearwardly at an angle of approximately twenty degrees, while the lower conveyors 38 and 42 are inclined rearwardly at a slightly greater angle to help elevate the material discharged therefrom to the same height as the material discharged from the upper conveyors 36 and 40.

As already suggested, the guide walls 22 may be adjusted to accommodate the width of the pile of compost which is to be turned over, and the stacking walls 24 may be adjusted to control the width of the new pile of compost to be molded. An operator standing at the steering wheel 26 may manipulate the controls of the machine as required to cause the machine to advance into one end of the initial pile of compost. At the same time, the electric motor 34 may be energized. Thus, the feed roller 30 is actuated through the endless belt drives 33 and 35, the peripheral rate of speed being approximately 1,000 feet per minute. In addition, the electric motors 76 of the conveyors 36 and 40 and the electric motors 136 of the conveyors 38 and 42 are energized. Thus, the conveyors 36, 40, 42 and 44 are actuated- the lineal rate of speed of the belts being approximately 400 feet per minute, less than one-half the peripheral rate of speed of the feed roller 30.

Referring particularly to FIG. 3, compost carried rearwardly over the back of the feed roller 30 may be deposited directly upon the upper conveyors 36 and 40, or it may drop between the conveyors 36 and 40 and be deposited directly upon the deflector plates 144 and/or 146. Compost deposited upon the deflector plates 144 and/or 146 is directed thereby to the conveyors 38 and 42. On the other hand, compost carried rearwardly over the back of the feed roller 30 may first strike the deflector plate 150 before being deposited and directed as aforesaid. The function of the several deflector plates 142, 142 and 148 is to aid the deflector plates 144, 146 and 150 in directing the compost to the conveyors and in preventing it from spilling over their sides. In any event, compost carried rearwardly over the back of the feed roller 30 is deposited upon one or another of the conveyors 36, 38, 40 and 42. The compost deposited by the feed roller 30 upon the conveyors 36 and 40 comes from the outer sections of the initial pile thereof fed to the conveyors 36 and 40 respectively by the opposite end sections of the feed roller 30, and the compost deposited upon the conveyors 38 and 42 comes from the central section of the initial pile thereof fed to the conveyors 38 and 42 respectively by the central section of the feed roller 30. Thus, the compost to be turned over is cross-mixed. The compost from the outer sections of the initial pile thereof is deposited in the center of the new pile thereof.

As indicated hereinbefore, the roller 30 is provided with a set of tines 32 which function to progressively separate compost from the initial pile thereof, carry it over the back of the roller and feed it to the several conveyors. In addition, the roller 30 is provided with a set of elements 152 which, as the compost separated from the initial pile thereof advances toward the conveyors, function to separate the compost into four sections directed respectively to the several conveyors, the two outer sections being directed respectively to the upper conveyors 36 and 40 and the two inner sections being directed respectively to the lower conveyors 38 and 42.

The tines 32 and the compost separating elements 152 are disposed in alternate rows thereof extending longitudinally of the roller 30 and circumferentially spaced 45 degrees apart. There are eight tines in each row thereof, preferably arranged as shown. There is one compost separating element 152 in alternate rows thereof and two compost separating elements 152 in intermediate rows thereof, the former being disposed midway from either end of the roller and the latter being disposed one-fourth the length of the roller respectively from the opposite ends of the roller, as shown. Each compost separating element 152 comprises a pair of opposite side plates 154 and 156 and a heel plate 158 arranged, as shown, to provide a relatively long compost separating leading edge 160 which is generally tangential to the surface of the roller 30.

It should be noted that by first loosening the U-bolts 84 securing the conveyors 36 and 40 to the tubular member 82, the conveyors 36 and 40 may be selectively shifted bodily to either side, and/or the angle of ten degrees at which the conveyors are set relative to the longitudinally extending central vertical plane of the machine may be adjusted, within limits. In addition, by changing the effective length of the link chains 90 the inclination of the conveyors may be varied. By first loosening the U-bolts 134 and 138 securing the conveyors 38 and 42 to the tubular members 132 and 136, the conveyors 38 and 42 may be selectively shifted bodily to either side, and/or the angle of ten degrees at which the conveyors are set relative to the longitudinally extending central vertical plane of the machine may be adjusted, within limits.

While in accordance with the provisions of the patent statutes, I have illustrated and described the best form of the embodiment of my invention now known to me, it will be apparent to those skilled in the art that changes may be made in the form of the compost machine described without departing from the spirit and scope of the invention as set forth in the appended claims.

What is claimed is:

1. A machine for turning over the compost in an initial pile thereof and molding the compost into a new pile comprising,
   A. a wheeled frame,
   B. feed means mounted on said frame and of a length to substantially span said initial pile of compost, said means being operable for feeding the compost from said initial pile thereof rearwardly and substantially parallel to the longitudinally extending central vertical plane of said machine,
   C. a plurality of conveyors to the rear of said feed means for receiving the compost from said feed means and carrying it further to the rear, certain of said conveyors being positioned for receiving compost discharged from sections of said feed means proximate said plane and for discharging it laterally away from said plane, and certain of said conveyors being positioned for receiving compost discharged from sections of said feed means more remote from said plane and for discharging it laterally toward said plane, so that the compost discharged respectively from said conveyors is cross-mixed, and
   D. pile forming means to the rear of said conveyors for restacking the compost after it has been cross-mixed and molding it into a new pile in which the compost from the outer sections of the initial pile of compost is deposited in the central section of the new pile of compost and the compost from the central section of the initial pile of compost is deposited in the outer sections of the new pile of compost.

2. A machine according to claim 1 wherein the conveyors are of the endless belt type, each being positioned for receiving compost from a different section of the feed means.

3. A machine according to claim 2 wherein the conveyors are of such width that if they were to be placed side by side the combined width would be sufficient to approximately equal the length of the feed means.

4. A machine according to claim 1 wherein the conveyors are of the endless belt type and arranged in two mutually overlying vertically spaced pairs, the upper pair being positioned to receive compost from the opposite end sections of the feed means and the lower pair being positioned to receive compost from intermediate sections of the feed means.

5. A machine according to claim 4 wherein the conveyors are inclined rearwardly.

6. A machine according to claim 5 wherein the tails of the upper pair of conveyors are aligned respectively with opposite end sections of the feed means and the conveyors converge rearwardly, and the tails of the lower pair of conveyors are aligned respectively with intermediate sections of the feed means respectively on opposite sides of the longitudinally extending central vertical plane of the machine and the conveyors diverge rearwardly.

7. A machine according to claim 4 wherein the feed means is a roller extending across said machine and mounting means for separating the compost as it is fed to the conveyors into four sections respectively directed to the several conveyors and each of a width approximately equal to one-fourth the length of said roller.

8. A machine according to claim 6 wherein the conveyors are mounted on said frame for being angularly adjusted both vertically and horizontally, and for being bodily shifted laterally, each relative to the others.

9. A machine according to claim 6 wherein compost projected rearwardly by the feed means into the space between the upper pair of conveyors is directed downwardly between the upper pair of conveyors and then to each side onto the lower pair of conveyors by a system of deflector plates carried by the frame and by the conveyors.

10. A machine according to claim 9 wherein the system of deflector plates includes a plate a short distance rearwardly of the feed means and extending at least across the space between the upper pair of conveyors, said plate depending from the roof of the frame to approximately the level to which the feed means carries the compost.

11. A machine according to claim 9 wherein the system of deflector plates includes a pair thereof mounted upon the proximate sides of the lower pair of conveyors and conjointly extending across the space between said conveyors, said plates being inclined toward the longitudinally extending central vertical plane of the machine.

12. A machine according to claim 6 wherein the space between the upper pair of conveyors is directly over the space between the lower pair of conveyors, and compost falling downwardly between the upper pair of conveyors is deposited upon a pair of deflector plates conjointly spanning the lower pair of conveyors and operative for directing compost to the lower pair of conveyors.

* * * * *